(12) United States Patent
Yoshida et al.

(10) Patent No.: US 7,758,678 B2
(45) Date of Patent: Jul. 20, 2010

(54) FUEL ADSORPTION FILTER AND AIR CLEANER

(75) Inventors: Tomohiro Yoshida, Nagoya (JP); Tatsuya Oyama, Takahama (JP); Haruhiko Saito, Toyota (JP); Tohru Ohba, Toyota (JP); Shinichi Kamiya, Kariya (JP); Masaki Aihara, Kasugai (JP); Yoichi Ishihara, Nagoya (JP)

(73) Assignees: Toyota Boshoku Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 287 days.

(21) Appl. No.: 12/103,896

(22) Filed: Apr. 16, 2008

(65) Prior Publication Data

US 2008/0257160 A1 Oct. 23, 2008

(30) Foreign Application Priority Data

Apr. 17, 2007 (JP) ............................. 2007-108095

(51) Int. Cl.
*B01D 53/02* (2006.01)

(52) U.S. Cl. ............... 96/135; 96/4; 96/11; 96/134; 96/138; 96/139; 96/153; 96/422

(58) Field of Classification Search ............. 96/4, 96/11, 134, 135, 138, 139, 153, 422
See application file for complete search history.

(56) References Cited

U.S. PATENT DOCUMENTS

| | | | | |
|---|---|---|---|---|
| 4,973,458 A * | 11/1990 | Newby et al. | .......... | 423/244.07 |
| 6,835,237 B2 | 12/2004 | Ishida | | |
| 2002/0029693 A1 * | 3/2002 | Sakakibara et al. | ........... | 96/134 |
| 2002/0124733 A1 * | 9/2002 | Iriyama et al. | ................ | 96/134 |
| 2002/0129711 A1 * | 9/2002 | Oda et al. | ..................... | 96/134 |
| 2003/0066427 A1 * | 4/2003 | Ishida | .......................... | 96/135 |
| 2005/0284298 A1 * | 12/2005 | Hirata | .......................... | 96/134 |
| 2006/0283326 A1 | 12/2006 | Oda | | |

(Continued)

FOREIGN PATENT DOCUMENTS

JP          2003-42017          2/2003

(Continued)

OTHER PUBLICATIONS

English language Abstract of JP 2003-42017, Feb. 13, 2003.

(Continued)

*Primary Examiner*—Robert J Hill, Jr.
*Assistant Examiner*—Christopher P Jones
(74) *Attorney, Agent, or Firm*—Greenblum & Bernstein P.L.C.

(57) ABSTRACT

A housing of an air cleaner has an air inlet port and an air outlet port, and incorporates an air filter. In the housing, a fuel adsorption filter is arranged downstream of the air filter in such manner as to intersect an air passage. An open portion and a sheet-like adsorption portion are vertically defined in an outer frame of the fuel adsorption filter. The adsorption portion has a fuel adsorbing function. A weir is provided in a boundary between the open portion and the adsorption portion. The weir limits air flow from the upstream side of the adsorption portion to the upstream side of the open portion. A flow straightening plate having a flow straightening function is provided in the open portion.

10 Claims, 10 Drawing Sheets

U.S. PATENT DOCUMENTS

| | | |
|---|---|---|
| 2006/0283426 A1 | 12/2006 | Oda et al. |
| 2007/0022880 A1 | 2/2007 | Mizutani et al. |
| 2007/0113740 A1 | 5/2007 | Oda |
| 2008/0141637 A1 | 6/2008 | Hirata et al. |
| 2008/0148699 A1 | 6/2008 | Sazawa et al. |
| 2008/0168902 A1* | 7/2008 | Suzuki ........................ 96/109 |

FOREIGN PATENT DOCUMENTS

| | | |
|---|---|---|
| JP | 2003-120445 | 4/2003 |
| JP | 2003-120455 | 4/2003 |
| JP | 2006-348835 | 12/2006 |

OTHER PUBLICATIONS

English language Abstract of JP 2003-120445, Apr. 23, 2003.
English language Abstract of JP 2006-348835, Dec. 28, 2006.
English language Abstract of JP 2003-120455, Apr. 23, 2003.

* cited by examiner

FUEL ADSORPTION FILTER AND AIR CLEANER

BACKGROUND OF THE INVENTION

The present invention relates to a fuel adsorption filter for adsorbing fuel vapor leaking from the intake system of an internal combustion engine such as an automobile engine, and to an air cleaner having the fuel adsorption filter.

Conventionally, for example, Japanese Laid-Open Patent Publication Nos. 2003-42017 and 2003-120445 each disclose an air filter having this type of fuel adsorption filter.

In the configuration disclosed in Japanese Laid-Open Patent Publication No. 2003-42017, an air filter is incorporated in a housing having an air inlet and an air outlet. The air filter traps dust in intake air supplied to the intake system of an internal combustion engine. In the housing, a sheet-like fuel adsorption filter having a fuel adsorbent such as activated carbon is located downstream of the air filter. The fuel adsorption filter is arranged orthogonal to the passage of air. The fuel adsorption filter adsorbs fuel vapor leaking from the intake system of the internal combustion engine.

Like the configuration of Japanese Laid-Open Patent Publication No. 2003-42017, the configuration of Japanese Laid-Open Patent Publication No. 2003-120445 includes an air filter incorporated in a housing with an air inlet and an air outlet. The air filter traps dust in intake air. On the downstream side of the air filter, a block-like fuel adsorption canister having a fuel adsorbent such as activated carbon is located in an inner bottom portion of the housing. The canister is arranged to partially intersect the passage of air. The fuel adsorption canister adsorbs fuel vapor leaking from the intake system of the internal combustion engine.

The above described conventional configurations have the following drawbacks.

That is, in the conventional configuration of Japanese Laid-Open Patent Publication No. 2003-120445, the sheet-like fuel adsorption filter is arranged in the entirety of an area that intersects the air passage on the downstream side of the air filter. The fuel adsorption filter increases the flow resistance in the air cleaner, thereby lowering the operation efficiency of the internal combustion engine. Further, since the fuel adsorption filter faces the entire area of the air passage, the combustion pressure in a backflow direction of the air flow is hardly released in a case of a backfire, and directly acts on the fuel adsorption filter. This can damage the fuel adsorption filter and attaching portions of the filter.

Also, the block-like fuel adsorption canister of Japanese Laid-Open Patent Publication No. 2003-120445 is arranged in a part of the passage downstream of the air filter without facing the entire area of the downstream side of the air filter. The canister thus cannot effectively adsorb fuel vapor leaking from the intake system of the internal combustion engine, and may allow the fuel vapor to be discharged to the atmosphere. To avoid such a drawback, the size of the fuel adsorption canister may be increased, so that its adsorption area is enlarged. However, this increases the flow resistance in the air cleaner, resulting in a lowered operation efficiency of the internal combustion engine.

The present invention was made for solving the above problems in the prior art. It is an objective of the present invention to provide a fuel adsorption filter and an air cleaner that effectively adsorb leaked fuel vapor, reduce flow resistance, and prevent damages caused by backfires.

SUMMARY OF THE INVENTION

To achieve the foregoing objective and in accordance with a first aspect of the present invention, a fuel adsorption filter is provided that is located in a housing and arranged downstream of an air filter. The fuel adsorption filter includes a sheet-like adsorption portion having fuel adsorbing function, and a weir. An outer periphery of the adsorption portion has a shape that corresponds to an inner peripheral shape of a lower part of an air passage in the housing. The weir is located at an upper edge of the adsorption portion, and projects toward the air filter.

In this fuel adsorption filter, since the adsorption portion is located in a lower part of the air passage, a sufficient amount of air is allowed to pass through an upper part of the adsorption portion. Also, since the adsorption portion is formed like a sheet, the adsorption portion allows a sufficient amount of air to pass therethrough.

An air cleaner having such a fuel adsorption filter lowers the flow resistance. Also, since the adsorption portion is defined in a lower part of the fuel adsorption filter, fuel vapor that has leaked from the intake system of the internal combustion engine and is drifting in a lower portion in the housing is effectively adsorbed by the adsorption portion. This improves the fuel vapor adsorption performance. Further, the weir is provided at the upper edge of the adsorption portion. Thus, intake air is prevented from flowing around to the open portions from the adsorption portion, which has a greater flow resistance than that of open portions. This suppresses turbulence in the air flow. Further, when a backfire occurs, the combustion pressure of the backfire is released through the open portion, so that the fuel adsorption filter and other members are prevented from being damaged.

BRIEF DESCRIPTION OF THE DRAWINGS

FIG. 6(*a*) is a cross-sectional view illustrating an air cleaner having a fuel adsorption filter according to a second embodiment;

FIG. 6(*b*) is an enlarged cross-sectional view of the air cleaner show in FIG. 6(*a*);

DETAILED DESCRIPTION OF THE PREFERRED EMBODIMENTS

Preferred embodiments of the present invention will now be described with reference to the drawings.

First Embodiment

A first embodiment will now be described with reference to FIGS. 1 to 5.

Figure 1:
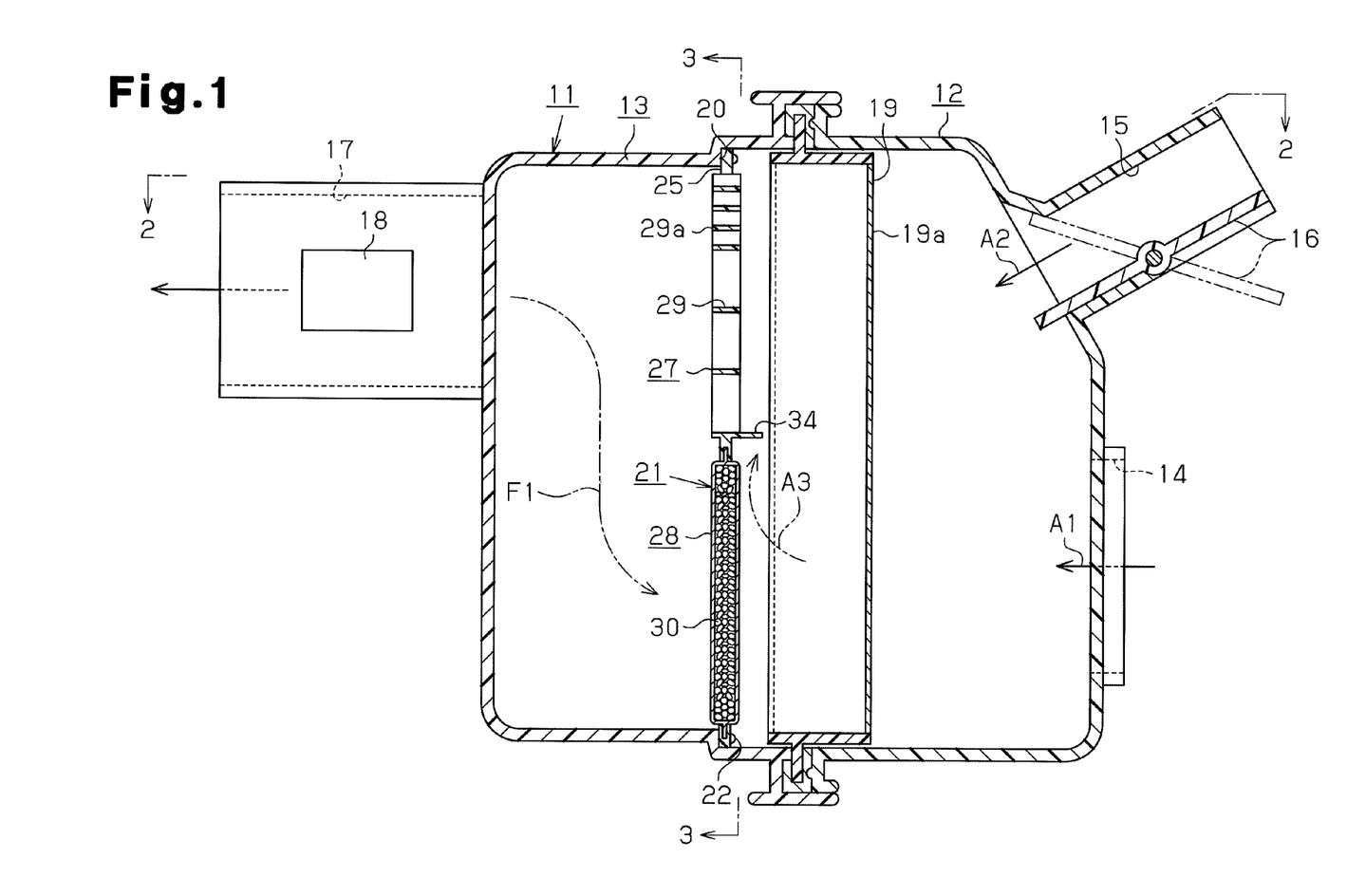
FIG. 1 is a cross-sectional view illustrating an air cleaner having a fuel adsorption filter according to a first embodiment.
Figure 2:
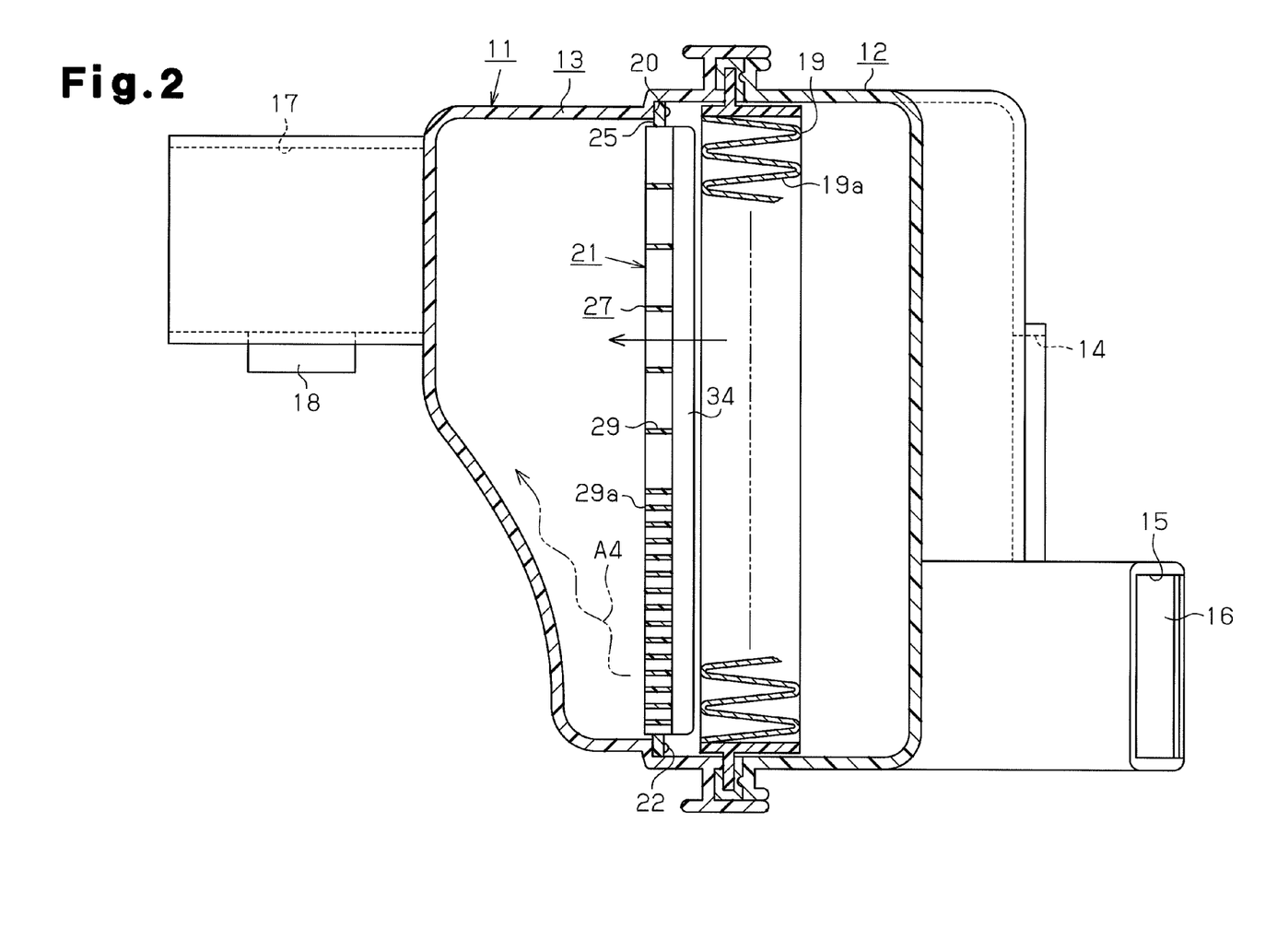
FIG. 2 is a cross-sectional view taken along line 2-2 of FIG. 1.

As shown in FIGS. 1 and 2, a housing 11 of an air cleaner according to the present embodiment includes a first housing portion 12 and a second housing portion 13. The first housing portion 12 and the second housing portion 13 are joined at their openings, and detachably coupled to each other with clamps (not shown).

The first housing portion 12 has air inlet portions, which are a first air inlet port 14 and a second air inlet port 15 in this embodiment. Switching means, which is an on-off valve 16 in this embodiment, is provided at the second air inlet port 15. In a high speed operation of the internal combustion engine, the on-off valve 16 is switched to an open position as illustrated by solid lines in FIG. 1. In other words, the on-off valve 16 is switched to an air introducing position, and air is guided into the housing through both of the first air inlet port 14 and the second air inlet port 15 as indicated by arrows A1, A2. In contrast, in a low speed operation of the internal combustion engine, the on-off valve 16 is switched to a closed position as illustrated by broken lines in FIG. 1, so that the second air inlet port 15 is closed. Air is thus drawn into the housing 11 only through the first air inlet port 14 as indicated by arrow A1.

An air outlet portion, which is an air outlet port 17 in this embodiment, is formed in the second housing portion 13. The air outlet port 17 is connected to the intake system of the internal combustion engine. An air flowmeter 18 for measuring an air flow rate is provided in the air outlet port 17.

As shown in FIGS. 1 and 2, an air filter 19 is arranged between the first housing portion 12 and the second housing portion 13. The air filter 19 has a pleated filter element 19*a*, which has alternately arranged ridges and valleys. The air filter 19 is arranged to intersect an air passage from the air inlet ports 14, 15 to the air outlet port 17. The filter element 19*a* filters air drawn into the intake system of the internal combustion engine, thereby trapping and removing dusts in the intake air.

Figure 3:
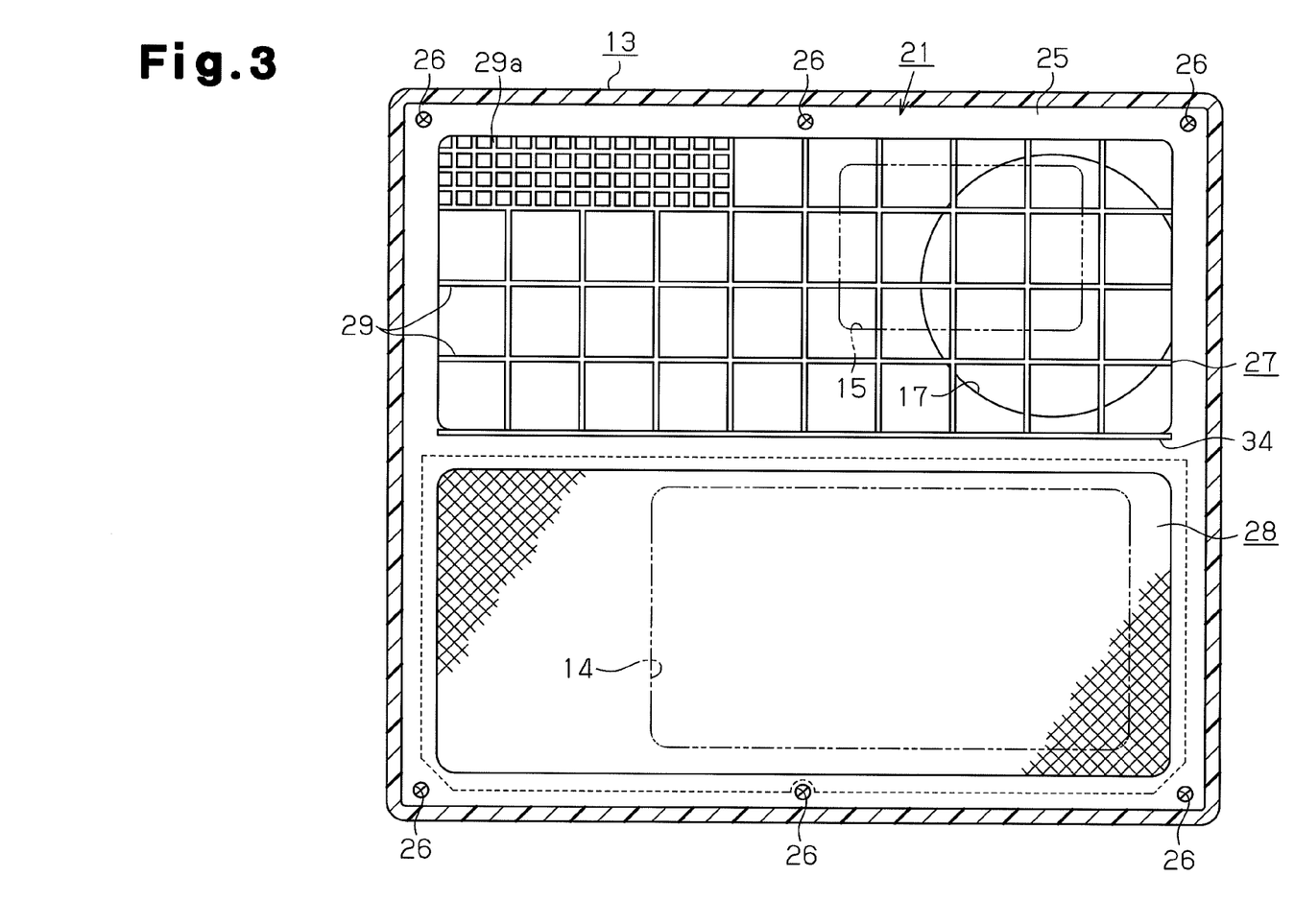
FIG. 3 is a cross-sectional view taken, along line 3-3 of FIG. 1.

As shown in FIGS. 1 to 3, a step-like base 20 is formed on the inner surface of the peripheral wall of the second housing portion 13. The base 20 is located downstream of the air filter 19 with respect to the flow of air. A fuel adsorption filter 21 is fixed to the base 20 through heat crimping of pins 22 formed on the base 20, such that the fuel adsorption filter 21 intersects the air passage. Fuel vapor F1 that leaks from the intake system when the internal combustion engine is not operating is adsorbed and removed by the fuel adsorption filter 21.

The configuration of the fuel adsorption filter 21 will now be described.

As shown in FIGS. 1 to 5, an outer frame 25 made of a synthetic resin is provided in the fuel adsorption filter 21. The outer frame 25 has an outer peripheral shape that is the same as the inner peripheral shape of the housing 11, that is, the shape of a plane that intersects the air passage in the housing 11. The outer frame 25 has a plurality of insertion holes 26 for receiving the pins 22 of the base 20. An open portion 27 is defined in an upper portion in the outer frame 25. The open portion 27 forms a main passage of the air passage. A sheet-like adsorption portion 28 having a fuel adsorbing function is defined in a lower portion of the outer frame 25. Therefore, the adsorption portion 28 has an outer peripheral shape that is the same as a plane that intersects a lower portion of the air passage in the housing 11.

Figure 4:
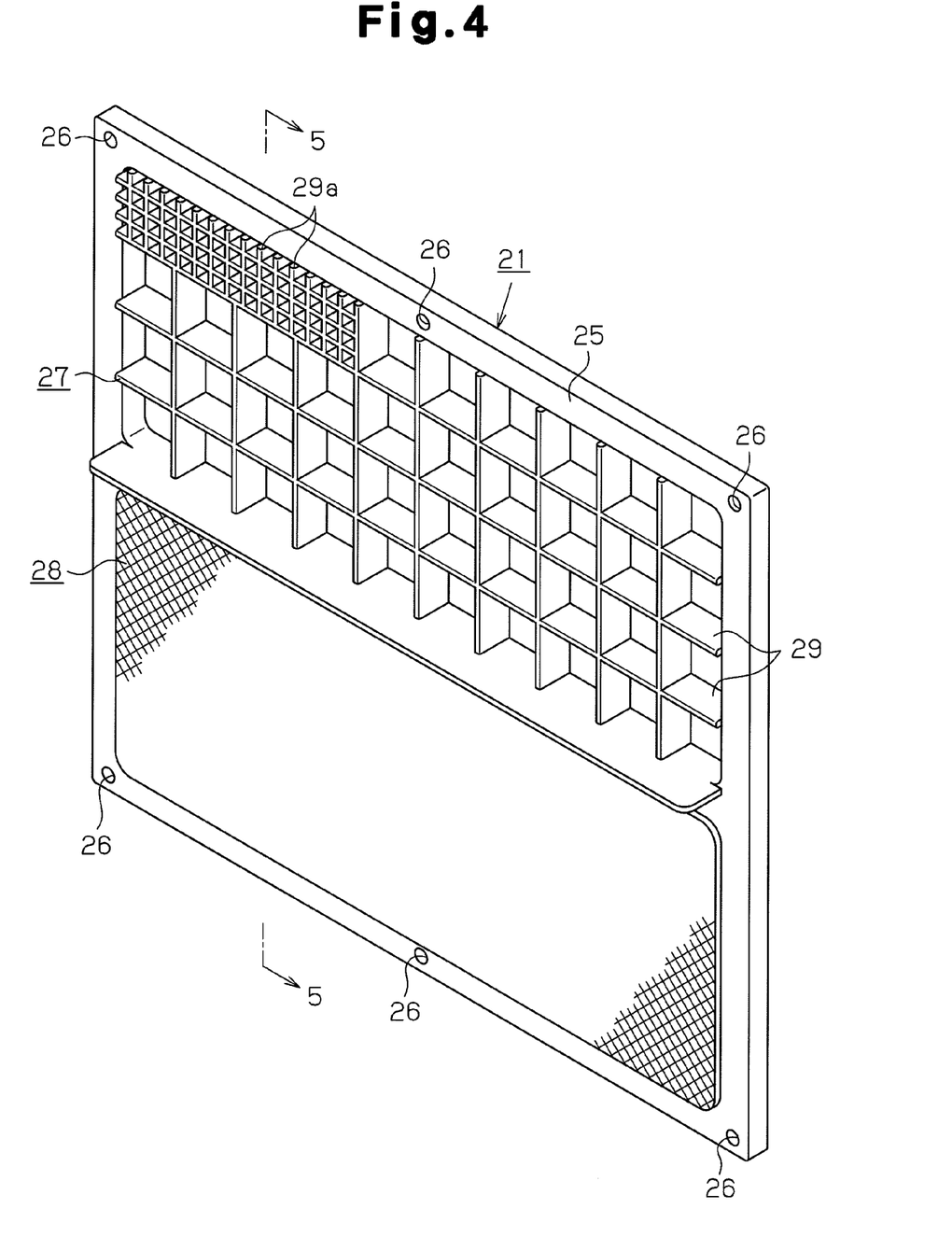
FIG. 4 is a perspective view illustrating the fuel adsorption filter of the air cleaner shown in FIG. 1.

As shown in FIGS. 3 and 4, a lattice-like flow straightening plate 29 is integrally formed with the outer frame 25 and is located in the open portion 27. The flow straightening plate 29 has vertical and horizontal fins that straighten the flow of intake air. A high-performance portion 29*a* is formed in an upper side portion of the flow straightening plate 29. In the high-performance portion 29*a*, the intervals between the fins are smaller than the other portions of the flow straightening plate 29. The high-performance portion 29*a* has a flow higher straitening performance than the other portions of the flow straightening plate 29. As shown in FIGS. 2 and 3, the open portion 27 is arranged at an upper portion in the housing 11 to correspond to the air outlet port 17. The high-performance portion 29*a* of the flow straightening plate 29 is located at a side opposite to the side where the air outlet port 17 is located. That is, the high-performance portion 29*a* arranged to correspond to a turbulent flow occurrence portion in the housing 11, in which turbulent flow A4 is likely to occur.

Figure 5:
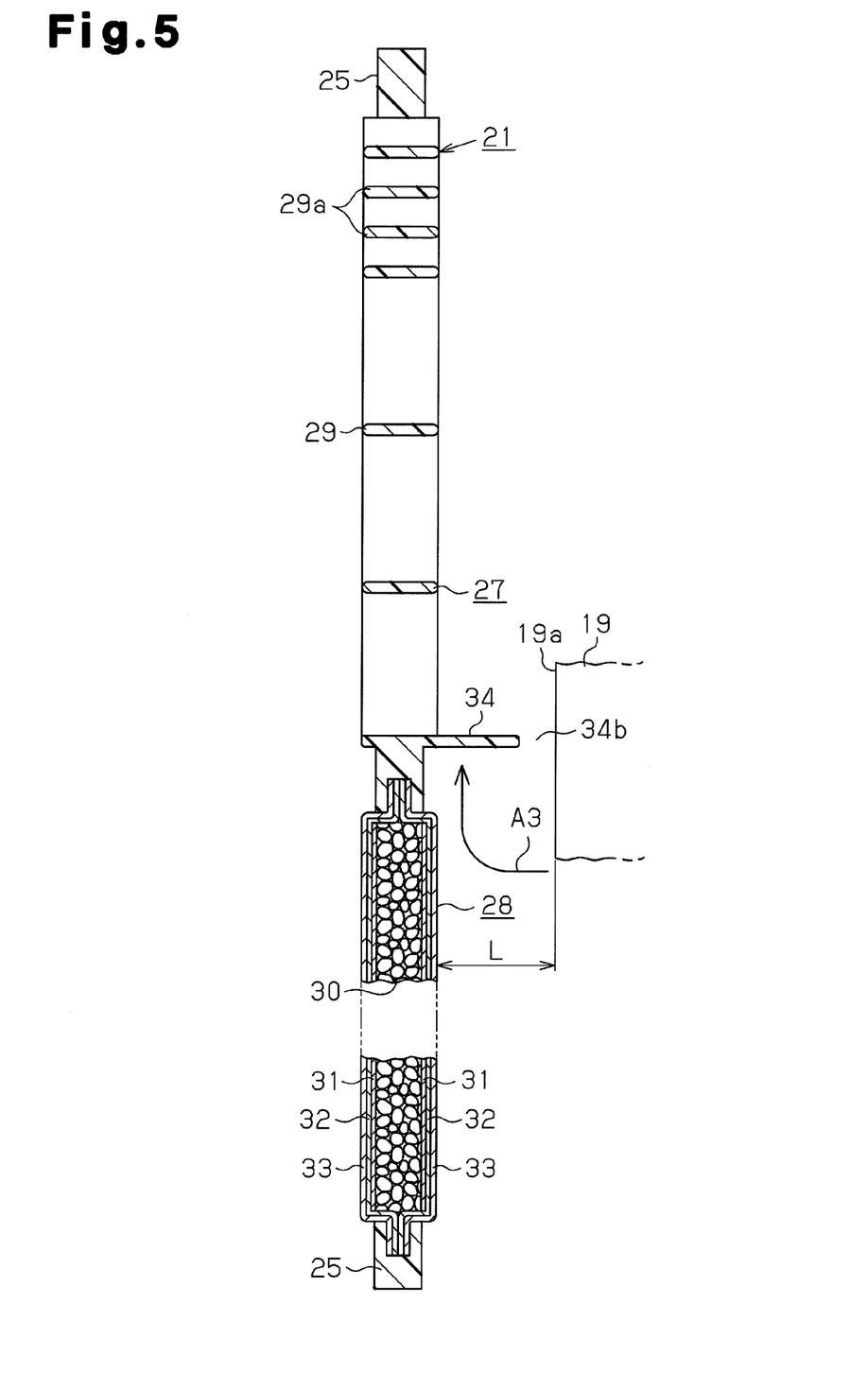
FIG. 5 is a cross-sectional view taken along line 5-5 of FIG. 4.

As shown in FIG. 5, the adsorption portion 28 of the fuel adsorption filter 21 includes granular adsorbent 30 such as activated carbon for adsorbing fuel vapor F1, a pair of reinforcing retaining nets 31 that retain the adsorbent 30 in an evenly spread state, a pair of holding sheets 32 for holding the retaining nets 31, and a pair of outer heat-resistant nets 33 for protecting the entire adsorption portion 28 from flames such as backfire and external force. The retaining nets 31 are formed of fiberglass, and the holding sheets 32 are formed of nonwoven fabric. In a state where the peripheral edges of the holding sheets 32 and the heat-resistant nets 33 are overlapped, the adsorption portion 28 is embedded in the outer frame 25. The adsorption portion 28 has a proper air permeability, which is, for example, 40% to 20% of that of the open portion 27.

As shown in FIGS. 1 to 5, on a side of the fuel adsorption filter 21 that corresponds to the air filter 19, a linear weir 34 extending along the upper edge of the adsorption portion 28 is formed in a portion of the outer frame 25 at the boundary between the open portion 27 and the adsorption portion 28. The weir 34 extends further than the flow straightening plate 29 of the open portion 27, and the distal end of the weir 34 contacts a side of the air filter 19. That is, as shown in FIG. 5, the weir 34 covers the distance L between the adsorption portion 28 and the top of the ridges of the filter element 19*a*. The weir 34 covers more than half the width of the distance L, and is separated from the element 19*a*. As shown by arrows in FIGS. 1 and 5, when intake air flow A3, which has passed through the air filter 19, is flowing around to the upstream side of the open portion 27, which has a low flow resistance, from the adsorption portion 28, which has a greater flow resistance than that of the open portion 27, the weir 34 prevents the intake air flow A3 from flowing around.

An operation of an air cleaner having the above described fuel adsorption filter 21 will now be described.

In a high speed operation of the internal combustion engine, the on-off valve 16 is switched to the open position as illustrated by solid lines in FIG. 1, so that the air flows A1, A2 are drawn into the housing through both of the first air inlet port 14 and the second air inlet port 15. In contrast, in a low speed operation of the internal combustion engine, the on-off valve 16 is switched to the closed position as illustrated by broken lines in FIG. 1, so that the air flow A1 is drawn into the housing 11 only through the first air inlet port 14. The intake air is then filtered by the filter element 19*a* of the air filter 19, and then passes through the open portion of the fuel adsorption filter 21 and the adsorption portion 28. Thereafter, the intake air is guided to the intake system of the internal combustion engine through the air outlet port 17. Therefore, foreign matter such as dust in the intake air is trapped and removed by the filter element 19a, so that purified air is supplied to the intake system of the internal combustion engine.

In this case, the adsorption portion 28 is not formed in the entire fuel adsorption filter 21, but the open portion 27 and the adsorption portion 28 are defined in an upper portion and a lower portion of the fuel adsorption filter 21, respectively. Thus, intake air does not receive a high flow resistance at the fuel adsorption filter 21, but is guided to the air outlet port 17 after passing through the open portion 27. Also, since the lattice-like flow straightening plate 29 is provided in the open portion 27, the intake air flow passing through the open portion 27 is straightened, so that the occurrence of turbulence in the air flow is suppressed. Further, the flow straightening plate 29 applies a proper degree of resistance to air flow, so that no great difference in the flow resistance is generated between the open portion 27 and the adsorption portion 28. Thus, the air flow is appropriately distributed to the open portion 27 and the adsorption portion 28, so that air flows through the entirety of the interior of the housing 11, while suppressing turbulence.

Further, the weir 34 is provided at the boundary between the open portion 27 and the adsorption portion 28 in the fuel adsorption filter 21. Therefore, as shown by arrows in FIGS. 1 and 5, when intake air flow A3 is flowing around to the upstream side of the open portion 27, which has a low flow resistance, from the adsorption portion 28, which has a great flow resistance, the weir 34 prevents the intake air flow A3 from flowing around. Therefore, turbulence of air flow is prevented from occurring at the boundary between the adsorption portion 28 and the open portion 27 in the fuel adsorption filter 21. As a result, the flow resistance is lowered. Further, the slight clearance 34a exists between the element 19a and the weir 34 so that they do not contact each other. Thus, vibration of the element 19a due to vibration of the vehicle does not cause the element 19a and the weir 34 to contact each other. Therefore, the element 19a is prevented from being damaged due to wearing.

Further, in a low speed operation of the internal combustion engine, if air flow A1 is drawn into the housing 11 only through the first air inlet port 14 with the on-off valve 16 at the closed position, turbulence A4 is likely to occur in a position offset from the air flow. However, since the high-performance portion 29a, in which the intervals of the lattice is small, is formed in the flow straightening plate 29 of the open portion 27 on the fuel adsorption filter 21, the air flow is effectively straightened by the high-performance portion 29a, which practically eliminates the turbulence A4. This lowers the flow resistance and allows the air flow rate to be accurately measured by the air flowmeter 18 provided in the air outlet port 17.

On the other hand, when the internal combustion engine is stopped, fuel vapor F1 leaking from the intake system enters the housing 11 through the air outlet port 17 of the air cleaner indicated by an arrow in FIG. 1. In this case, being heavier than the atmospheric air, the fuel vapor F1 drifts on the inner bottom of the housing 11 in a crawling manner. Since the adsorption portion 28 having the adsorbent 30 such as activated carbon is provided in a lower portion of the fuel adsorption filter 21, the fuel vapor F1 is effectively adsorbed by the adsorbent 30 of the adsorption portion 28 and removed from the atmospheric air. The adsorbed fuel vapor is drawn into the internal combustion engine through the operation of the internal combustion engine. Therefore, the fuel vapor F1 is prevented from being discharged to the atmosphere.

Further, when backfire occurs, the accompanying combustion pressure is released through the open portion 27. Therefore, the fuel adsorption filter 21 and members for attaching the fuel adsorption filter 21 to the housing 11 are prevented from being damaged.

The present embodiment has the following advantages.

(1) In the fuel adsorption filter 21 of the present embodiment, the open portion 27 formed in the upper portion of the outer frame 25 ensures a sufficient air permeability. Therefore, compared to the prior art configuration in which the adsorption portion is formed in the entire area of the air passage, the present embodiment lowers the flow resistance.

(2) Since the adsorption portion 28 is defined in the entire area of the lower portion of the outer frame 25, the fuel vapor F1 leaking from the intake system of the internal combustion engine is effectively adsorbed by the adsorption portion 28.

(3) Since the weir 34 is provided at the boundary between the open portion 27 and the adsorption portion 28, intake air flow A3 is prevented from flowing around to the open portion 27, which has a smaller flow resistance, from the adsorption portion 28, which has a greater flow resistance than that of the open portion 27. This suppresses turbulence in the air flow. Therefore, the flow resistance is prevented from being increased, and the detection accuracy of the air flowmeter 18 is prevented from being degraded.

(4) The open portion 27 includes the flow straightening plate 29, which has a flow straightening function. This prevents the occurrence of turbulence. Also, since the flow straightening plate 29 serves as a moderate resistance, so that air flow is evenly distributed to the entire interior of the housing 11.

(5) The element 19a and the weir 34 are prevented from contacting each other, so that the element 19a is not damaged.

(6) In correspondence with the turbulence generation portion in the housing 11, the high-performance portion 29a having a higher flow straightening performance is provided in a part of the flow straightening plate 29. The occurrence of turbulence is therefore suppressed.

(7) Since the combustion pressure of a back fire is released through the open portion 27, members such as fuel adsorption filter 21 are prevented from being damaged.

Second Embodiment

Figures 6A, 6B:
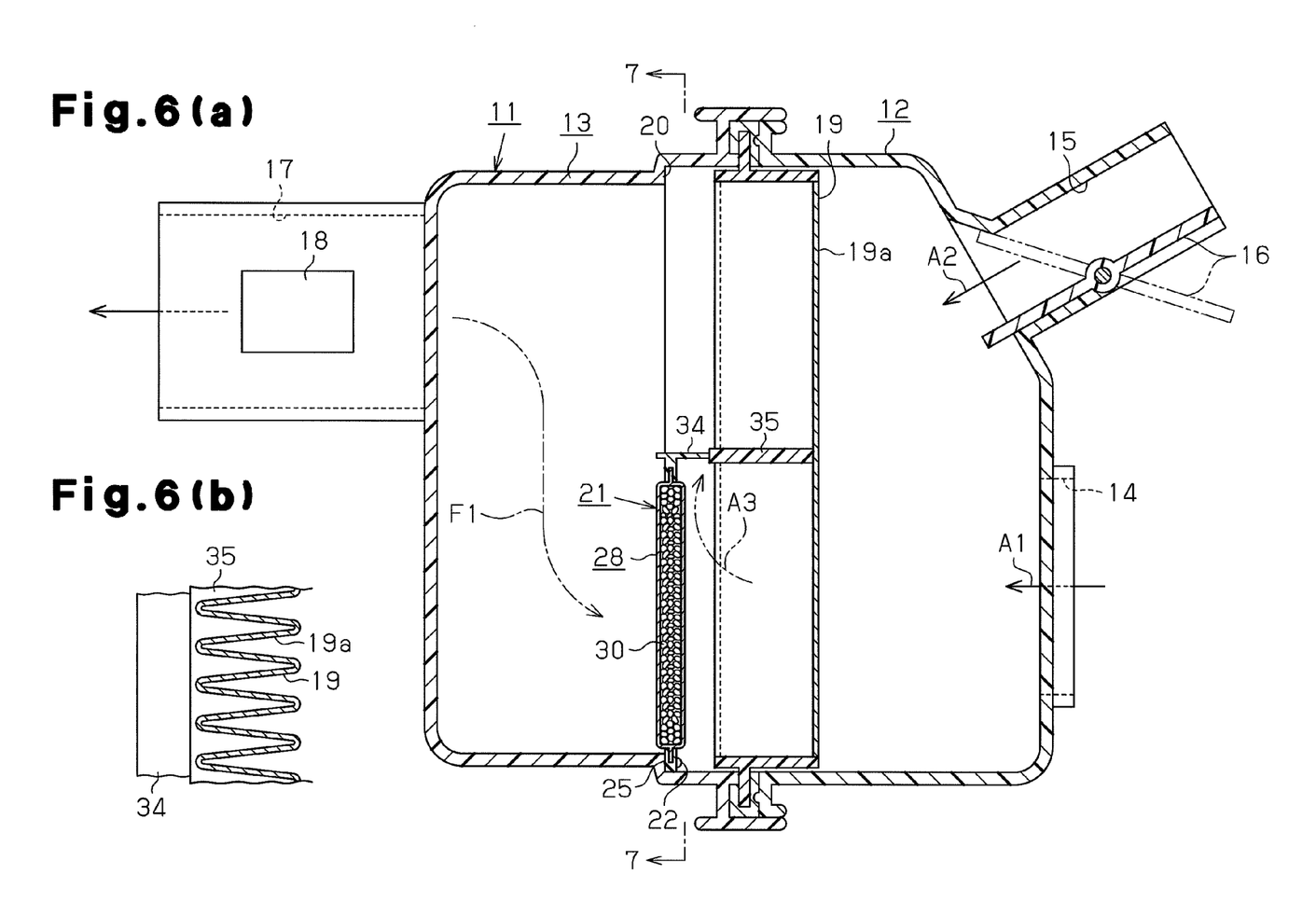
Figure 7:
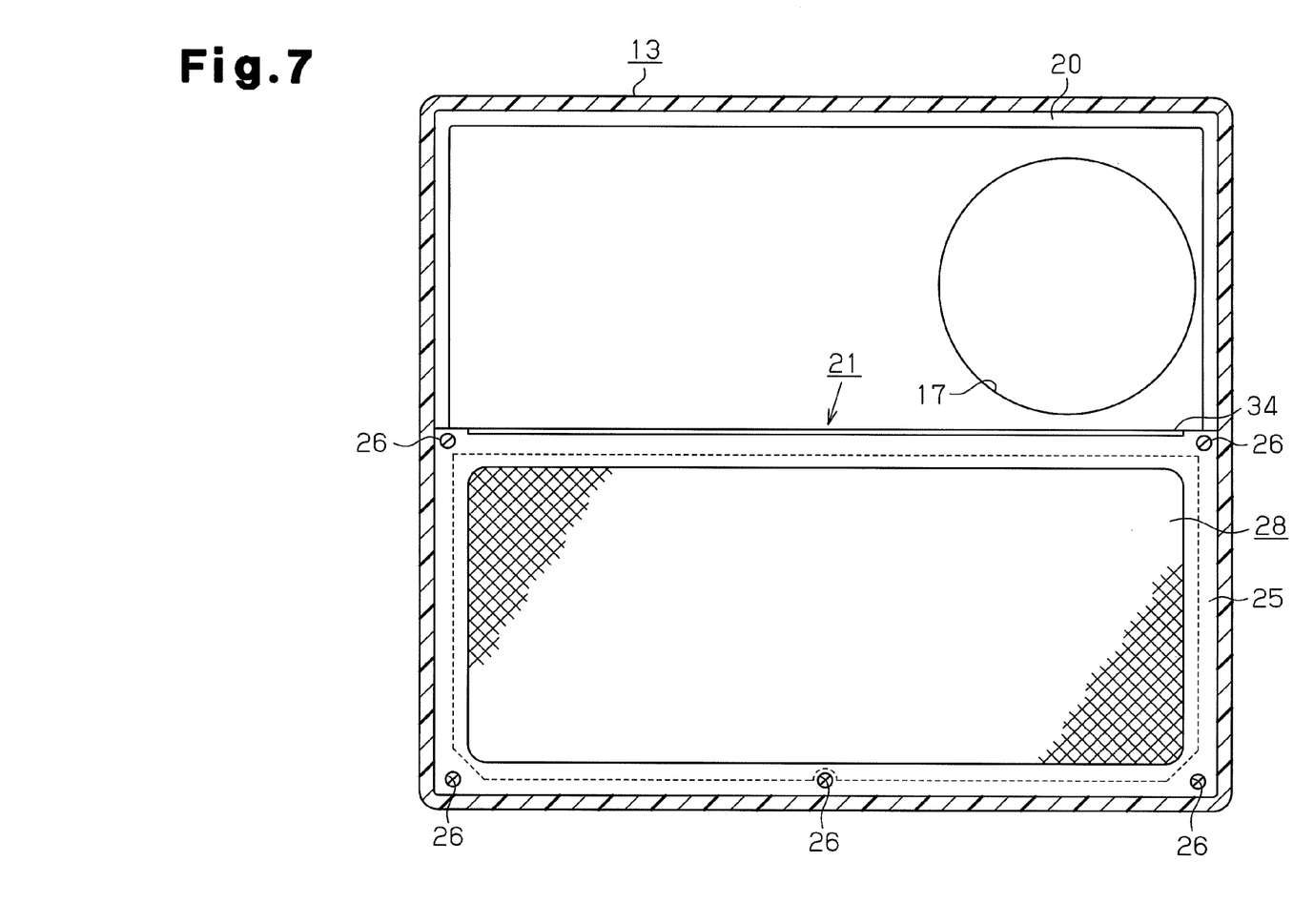
FIG. 7 is a cross-sectional view showing a fuel adsorption filter.

A second embodiment of the present invention will now be described with reference to FIGS. 6(a), 6(b) and 7. The differences from the first embodiment will mainly be discussed.

In this embodiment, a portion of the outer frame 25 in the fuel adsorption filter 21 that constructs the open portion 27, and the flow straightening plate 29 including the high-performance portion 29a are omitted. Therefore, the size of the filter according to the second embodiment is half the size of the fuel adsorption filter 21 of the first embodiment.

The element 19a of the air filter 19 has a synthetic resin retaining member 35 for retaining the shape of the pleats. The retaining member 35 slightly projects toward the fuel adsorption filter 21. The weir 34 is constructed in such a manner that the distal edge is contactable with the distal end of the retaining member 35. The contactable state includes a state in which the parts are always contact each other.

Thus, the second embodiment has the same advantages as the first embodiment except for the advantage of the flow straightening plate 29 including the high-performance portion 29a. The second embodiment further has the following advantages.

(8) Since the retaining member 35 of the air filter 19 is contactable with the weir 34, the intake air flow A3 is reliably prevented from flowing around to the upper surface of the weir 34, which has a small flow resistance, from the adsorption portion 28, which has a greater flow resistance. This suppresses turbulence in the air flow.

(9) The size of the outer frame 25 is reduced and the flow straightening plate 29 is omitted. This reduces the weight of the outer frame 25.

(10) Since the retaining member 35 of the air filter 19 is contactable with the weir 34, the element 19a is prevented from being greatly deformed by intake flow. The filtering performance is thus maintained for an extended period of time.

Third Embodiment

Figure 8:
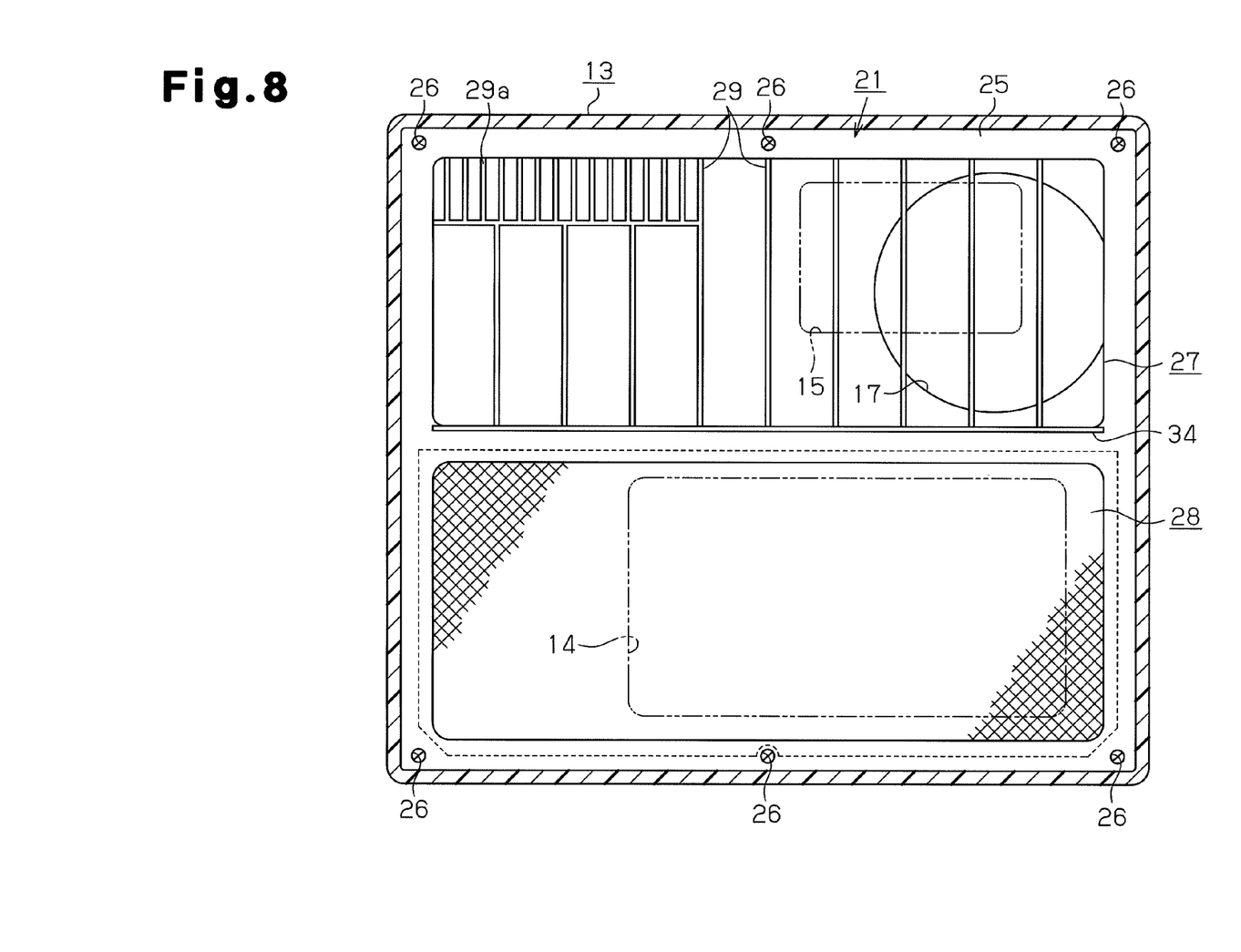
FIG. 8 is a cross-sectional view illustrating a fuel adsorption filter according to a third embodiment.

A third embodiment of the present invention will now be described with reference to FIG. 8. The differences from the first embodiment will mainly be discussed.

In the third embodiment, the flow straightening plate 29 having the high-performance portion 29a in the open portion 27 in the fuel adsorption filter 21 is not formed like a lattice, but formed only by fins, which extend parallel in the vertical direction.

Thus, the third embodiment has substantially the same advantages as the first embodiment.

Fourth Embodiment

Figure 9:
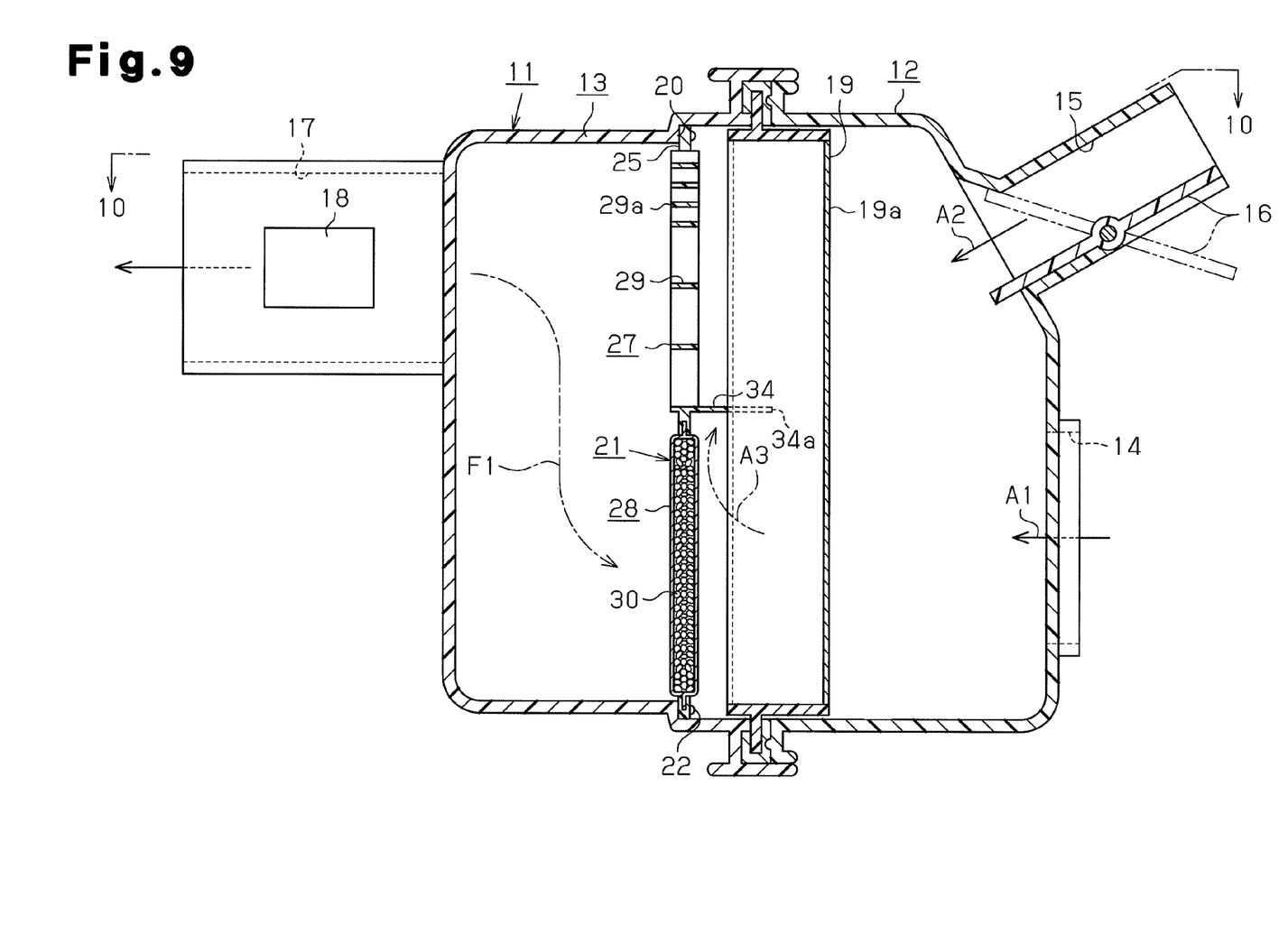
FIG. 9 is a cross-sectional view illustrating an air cleaner having a fuel adsorption filter according to a fourth embodiment.
Figure 10:
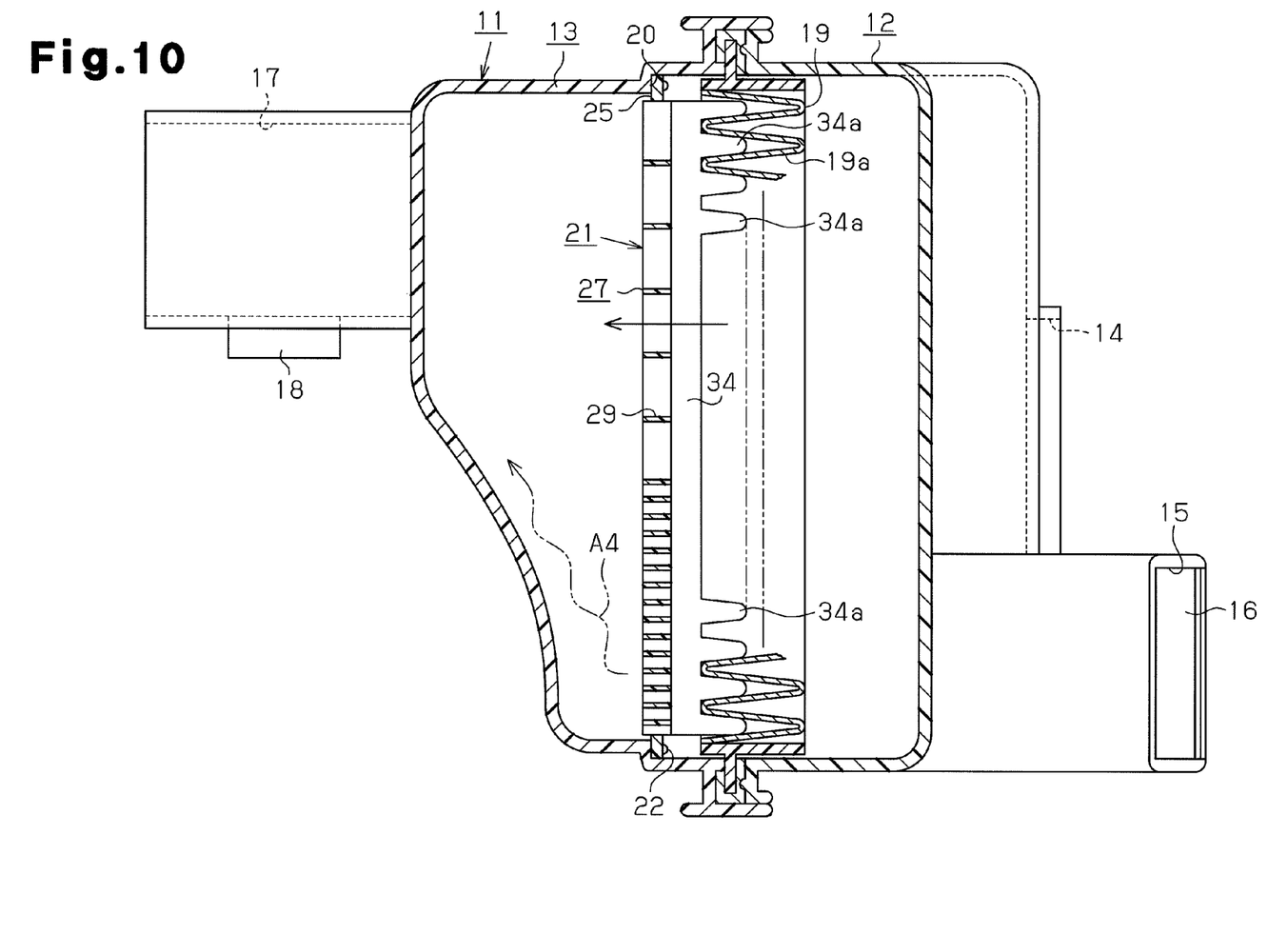
FIG. 10 is a cross-sectional view illustrating an arrangement of projections of a weir.

A fourth embodiment of the present invention will now be described with reference to FIGS. 9 and 10. The differences from the first embodiment will mainly be discussed.

In the fourth embodiment, a plurality of projections 34a are continuously formed on the distal edge of the weir 34. The pitch of the arrangement of the projections 34a is the same as the pitch of the ridges and valleys of the air filter 19. The projections 34a protrude into the valleys of the downstream side of the air filter 19 with respect to the air flow, and engaged with the surfaces of the ridges, thereby maintaining the pleats shape of the air filter 19.

When intake air flow is generated in the housing 11 so that air is filtered, the pressure difference between the upstream side and the downstream side of the air filter 19 acts to deform the pleats of the air filter 19. Such deformation is suppressed by the projections 34a. Particularly, if a great amount of trapped dust is stored in the air filter 19, a pressure difference generated between the upstream side and the downstream side of the air filter 19 acts to deform the air filter 19 in such manner that the valleys on the downstream side of the air flow narrow. Such deformation makes it difficult for air to pass through the air filter 19, degrading the filtering performance. Also, such deformation increases the flow resistance, and can significantly lower the operational efficiency of the internal combustion engine. The fourth embodiment eliminates these drawbacks.

In addition to substantially the same advantages as the first embodiment, the fourth embodiment has the following advantages.

(11) The filter element 19a is prevented from being deformed, so that the filtering performance of the air cleaner and the operational efficiency of the internal combustion engine are reliably maintained.

(12) Since the construction of the present embodiment only requires the projections 34a, which are integrally formed with the weir 34. The number of the parts is thus not increased.

<Modifications>

The above described embodiments may be modified as described below.

The flow straightening plate 29 including the high-performance portion 29a may be structured only by parallel horizontal plates.

The flow straightening plate 29 and the high-performance portion 29a may have a honeycomb structure.

In the first embodiment, the weir 34 may be contactable with the element 19a of the air filter 19 as in the second embodiment.

The invention claimed is:

1. A fuel adsorption filter provided downstream of an air filter in a housing, the fuel adsorption filter comprising:
   a sheet-like adsorption portion having a fuel adsorption function, an outer periphery of the adsorption portion having a shape that corresponds to an inner peripheral shape of a lower part of an air passage in the housing; and
   a weir located at an upper edge of the adsorption portion, the weir projecting toward the air filter,
   wherein the fuel adsorption filter has an outer peripheral shape that corresponds to an entire inner periphery of the air passage,
   wherein the adsorption portion is located in the lower part of the air passage,
   wherein an open portion of the adsorption filter is formed in an upper part of the air passage, and
   wherein a flow straightening plate having a flow straightening function is provided in the open portion.

2. The fuel adsorption filter according to claim 1, wherein the air filter is pleated, and wherein the weir is located in the vicinity of the air filter.

3. The fuel adsorption filter according to claim 1, wherein the air filter is pleated, and wherein the weir is contactable with the air filter.

4. The fuel adsorption filter according to claim 1, wherein the air filter has a plurality of ridges and a plurality of valleys that are arranged alternately, and wherein the weir has a projection that is capable of entering one of the valleys of the air filter.

5. The fuel adsorption filter according to claim 1, wherein the flow straightening plate has a high-performance portion that has a higher flow straightening function than the other portions of the flow straightening plate.

6. An air cleaner comprising:
   the fuel adsorption filter according to claim 1;
   an air filter; and
   a housing having an air inlet portion and an air outlet portion, the housing incorporating the air filter,
   wherein, in the housing, the fuel adsorption filter is located downstream of the air filter in such manner as to intersect an air passage.

7. An air cleaner comprising:
   the fuel adsorption filter according to claim 2;
   an air filter; and
   a housing having an air inlet portion and an air outlet portion, the housing incorporating the air filter,
   wherein, in the housing, the fuel adsorption filter is located downstream of the air filter in such manner as to intersect an air passage.

8. An air cleaner comprising:
   the fuel adsorption filter according to claim 3;
   an air filter; and
   a housing having an air inlet portion and an air outlet portion, the housing incorporating the air filter, wherein, in the housing, the fuel adsorption filter is located downstream of the air filter in such manner as to intersect an air passage.

9. An air cleaner comprising:
the fuel adsorption filter according to claim 4;
a pleated air filter; and
a housing having an air inlet portion and an air outlet portion, the housing incorporating the air filter,
wherein, in the housing, the fuel adsorption filter is located downstream of the air filter in such manner as to intersect an air passage, and wherein the projection of the weir is caused to enter a valley of the air filter, so that the pleated shape of the air filter is maintained.

10. An air cleaner comprising:
the fuel adsorption filter according to claim 5;
an air filter; and
a housing having an air inlet portion and an air outlet portion, the housing incorporating the air filter, and
a switch to switch the air inlet portion between an air drawing state and a closed state,
wherein, in the housing, the fuel adsorption filter is located downstream of the air filter in such manner as to intersect an air passage,
wherein the high-performance portion is arranged in correspondence with a turbulence generation portion in the housing, and
wherein turbulence caused by switching of the air inlet portion by the switch is suppressed by the high-performance portion.

* * * * *